(12) United States Patent
Colbeth et al.

(10) Patent No.: US 6,653,992 B1
(45) Date of Patent: Nov. 25, 2003

(54) METHOD AND CIRCUIT FOR REDUCTION OF CORRELATED NOISE

(75) Inventors: Richard E. Colbeth, Los Altos, CA (US); Ivan P. Mollov, Cupertino, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 164 days.

(21) Appl. No.: 09/797,076

(22) Filed: Feb. 28, 2001

(51) Int. Cl.[7] .......................... G09G 3/36; G01R 19/00; H03B 1/00; H04N 5/217
(52) U.S. Cl. .............................. 345/55; 345/93; 345/98; 327/52; 327/552; 348/241
(58) Field of Search ................................ 345/55.93, 98; 348/241; 327/52–56, 65, 552, 554, 558

(56) References Cited

U.S. PATENT DOCUMENTS

| | | | | |
|---|---|---|---|---|
| 5,489,910 A | * | 2/1996 | Kuwata et al. ............. | 345/212 |
| 5,581,274 A | * | 12/1996 | Tagawa ....................... | 345/104 |
| 5,589,847 A | * | 12/1996 | Lewis .......................... | 345/98 |
| 5,717,457 A | * | 2/1998 | Morimoto .................... | 348/241 |
| 5,739,803 A | * | 4/1998 | Neugebauer ................. | 345/98 |
| 5,953,060 A | * | 9/1999 | Dierickx ...................... | 348/241 |
| 6,118,438 A | * | 9/2000 | Ho .............................. | 345/204 |
| 6,331,844 B1 | * | 12/2001 | Okumura et al. ............. | 345/87 |
| 6,359,607 B1 | * | 3/2002 | Yanagi et al. ................. | 345/94 |
| 6,469,740 B1 | * | 10/2002 | Kuroda et al. .............. | 348/308 |

OTHER PUBLICATIONS

Brailean, James C. et al.; "Noise Reduction Filters For Dynamic Image Sequences: A Review"; *Proceedings of the IEEE*; vol. 83, No. 9; Sep. 1995; pp. 1272–1292.

* cited by examiner

*Primary Examiner*—Bipin Shalwala
*Assistant Examiner*—Prabodh Dharia
(74) *Attorney, Agent, or Firm*—Bingham McCutchen LLP

(57) ABSTRACT

A method and circuit for reducing correlated noise in imagers is disclosed. According to an aspect, correlated noise is reduced by coupling the reference inputs of imager amplifiers to common voltage sources. The reference inputs of differential amplifiers on the imager can be coupled to common noise sources such as the imager low gate voltage and array bias voltage through suitably chosen capacitances.

34 Claims, 3 Drawing Sheets

METHOD AND CIRCUIT FOR REDUCTION OF CORRELATED NOISE

BACKGROUND AND SUMMARY

The invention relates to imaging devices, such as flat panel imagers. An imager is a device that receives electromagnetic radiation, e.g., light or x-rays, from the direction of something to be imaged in which an image is formed based the detected pattern of the radiation received at the imager. A flat panel imager is a type of imager that comprises a matrix/array of detection elements, with each detection element providing a separate item of image data that is usable to reconstruct an image. For light-sensitive imagers, each detection element comprises a photosensitive device. For x-ray sensitive imagers, each detection element comprises an x-ray sensitive device.

FIG. 1 depicts one configuration of electrical components for a flat panel imager, showing selectable wiring connections to transmit the voltage, current, or charge created by detection elements on the imager. Each image element 104 in the imager of FIG. 1 comprises a photodiode 106 that generates an electrical signal in response to a light input. In an x-ray imager, the photodiode 106 receives light input from an x-ray scintillator element that generates light in response to x-rays. A transistor 108 (such as a thin-film N-type FET) functions as a switching element for the image element 104. When it is desired to capture image data from image element 104, control signals 114 are sent to gate driver 112 to "select" the gate of transistor 108. Electrical signals from the photodiode 106 are passed through line 116 to a charge amplifier 110. The output of charge amplifier 110 is sent to a "sample and hold" stage for further image processing/display. While FIG. 1 only shows four image elements 104a–104d, it is likely that the typical flat panel imager includes many such image elements 104 depending upon the size and resolution of the imaging device.

Many imagers perform simultaneous sampling of image data from multiple image elements in a correlated manner. For example, the imager of FIG. 1 collects image data from an entire line of image elements (i.e., row or column) at the same time. To form an entire image frame, each line of image data is collected on a line-by-line basis until all lines for the image has been sampled. To obtain image data for a line of image elements, all the switching transistors (e.g., 108a and 108b) for image elements (e.g., 104a and 104b) on the same line are tied to the same control line 126 extending from gate driver 112. When the image data for a particular line of image elements is desired, control signals 114 are sent to the gate driver 112 to select the transistor gates for the desired line of image elements. The electrical signals from the entire line of image elements are passed to their corresponding charge amplifiers, which output signal data to the subsequent sampling stage.

The photodiodes 106 of FIG. 1 are connected to a common node 122 to supply a reverse bias voltage for the image element array. The gate driver 112 is connected to a node 124 to supply low gate voltage to drive the gate control lines. Parasitic capacitance may exist in the imager, such as $C_{gd}$ to the gate control line and $C_{ad}$ to the common array bias line for each image element. Each amplifier (110a, 110b, etc.) may gain noise (e.g., AC noise) present on the low gate voltage and array bias voltage depending upon the ratio of the capacitances. If an entire line of image data is sampled at the same time, then the same noise offset may exist for every pixel in that line, which causes the corresponding line of pixels in the final image to appear markedly different from other lines of pixels. This type of "image artifact" is created in the example of FIG. 1 because the low gate voltage and the array bias voltage are common for the amplifiers in the circuit. Compared to random pixel noise, this correlated noise is often relatively more visible and may significantly degrade image quality.

The present invention is directed to a method and mechanism for reducing correlated noise. According to an embodiment, the invention reduces correlated noise in imagers induced by noise in common supply voltages to the imager electronics, in which the reference input of each coordinated amplifier is connected to common voltage sources. An aspect of an embodiment is directed to coupling the reference input of differential amplifiers on the imager to common noise sources such as the imager low gate voltage and array bias voltage through suitably chosen capacitances. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Figure 1:
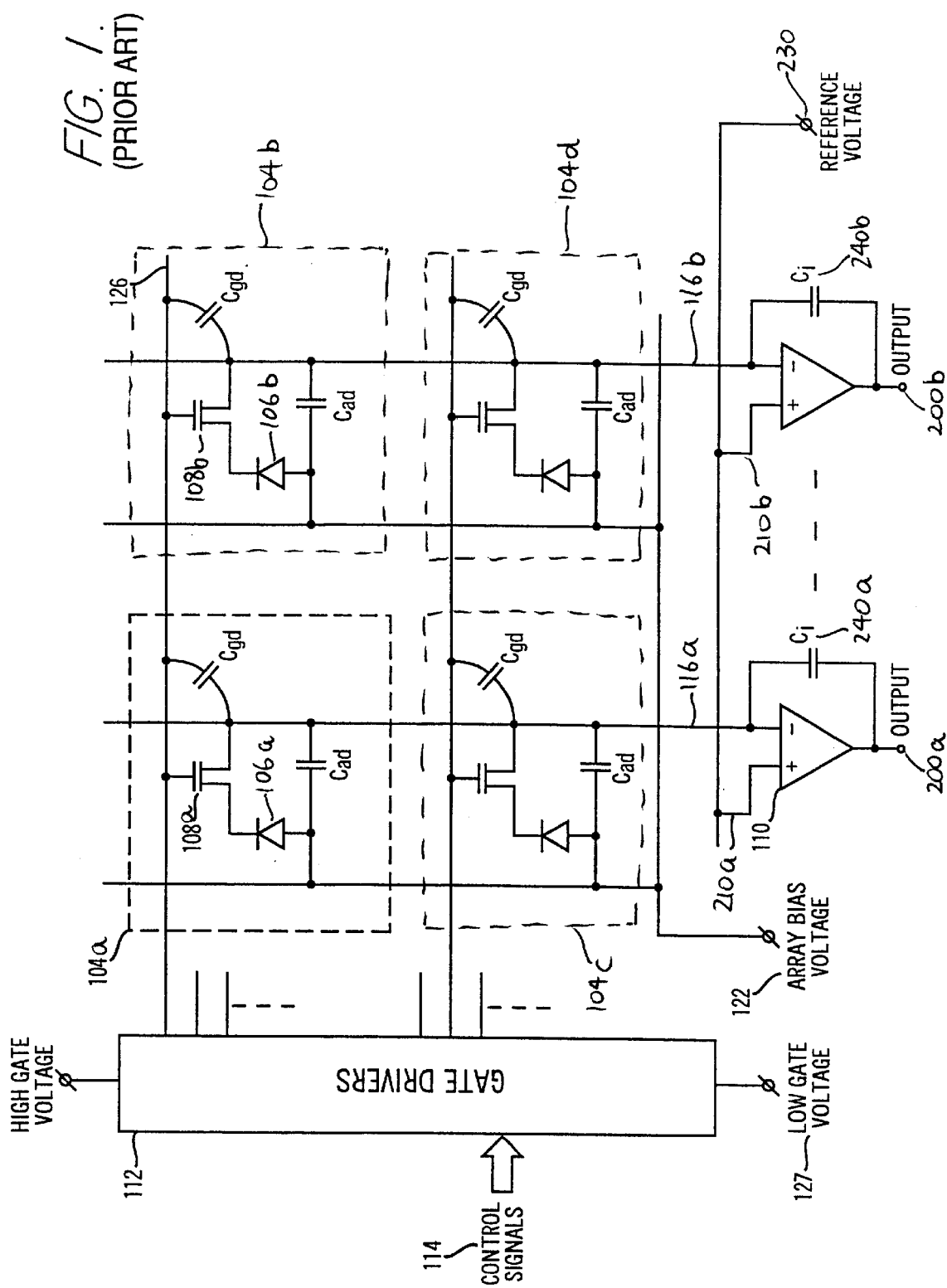
FIG. 1 shows a simplified schematic of imager electronics.
Figure 2:
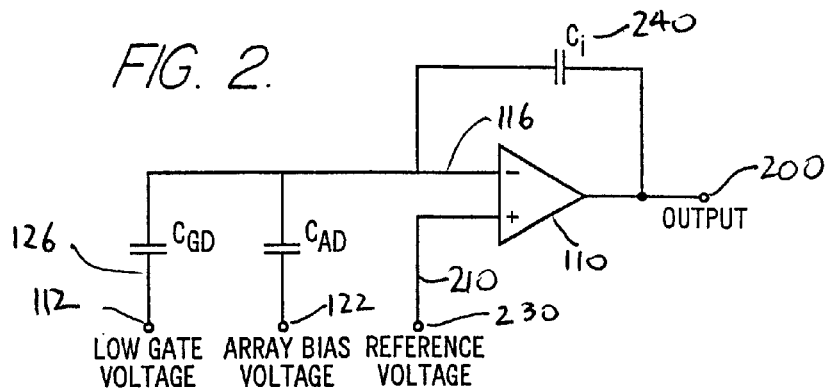
FIG. 2 depicts an equivalence schematic for components shown in FIG. 1.

The present invention is directed to a method and mechanism for reducing correlated noise in imagers. The invention is useful for reducing line correlated noise in flat panel imagers induced by noise in common supply voltages to the imager electronics. To illustrate the invention, FIG. 2 shows an equivalence schematic for an amplifier (e.g., 110a, 110b, etc.) shown in FIG. 1. $C_{GD}$ and $C_{AD}$ represent equivalents for the capacitances of the input line 116 for each amplifier 110, which is a summation of capacitances for the input line for the example of FIG. 1. If the integrating capacitor $C_i$ is approximately 1 pF and the parasitic capacitances $C_{GD}$ and $C_{AD}$ are approximately 30 pF each, then the approximate gain for each noise source in this example is 30.

Figure 3:
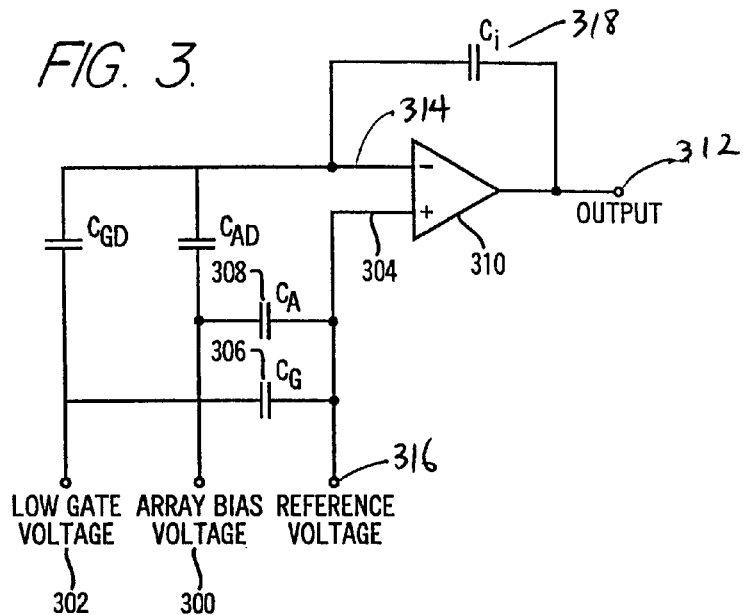
FIG. 3 is a schematic of an embodiment of the invention in which capacitance components are coupled between common noise sources and a reference input of an amplifier.

The present invention reduces correlated noise by coupling an input of the amplifiers to one or more of the common noise sources. In an embodiment, this coupling is performed through additional capacitance elements introduced in the imager electronics. FIG. 3 shows a schematic of a first embodiment of the invention, in which amplifier 310 is a differential amplifier (e.g., 110a, 110b, etc.). A component $C_A$ 308 is electrically coupled between the array bias voltage source 300 and the reference input 304 for amplifier 310. A component $C_G$ 306 is electrically coupled between the low gate voltage source 302 and the reference input 304. By placing these components between the noise sources and the reference input of the differential amplifiers, the noise from voltage sources 300 and 302 is passed to the non-inverting input of the differential amplifiers. This compensates, in whole or part, for noise signals applied to each amplifier 310 through the imager panel.

The additional capacitance components are preferably coupled directly to the common voltage sources shared by all amplifiers in the imager circuit. Other suitable approaches to connect common noise sources to the circuit amplifiers, other than direct coupling of all amplifiers to common voltage sources, may be employed in the invention to reduce correlated noise.

Figure 4:
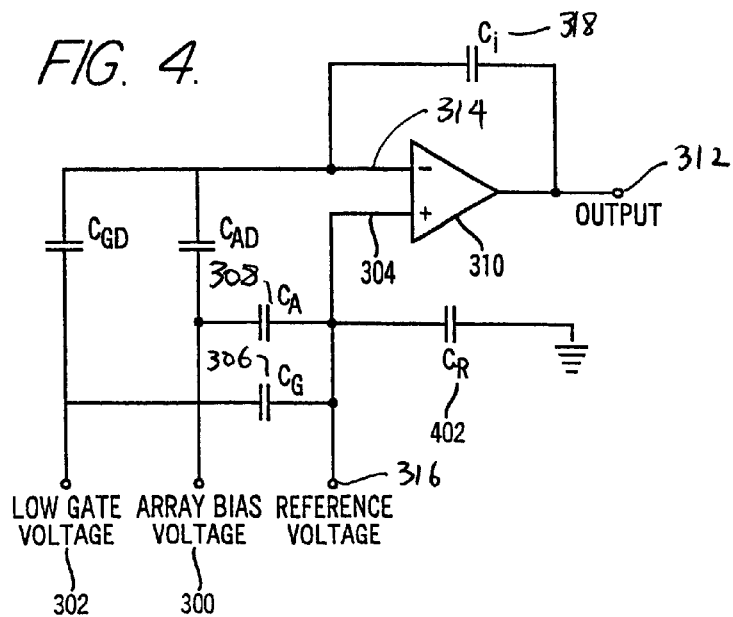
FIG. 4 is a schematic of an embodiment of the invention in which a capacitance component is coupled between ground and the reference input of an amplifier.

FIG. 4 shows a schematic of another embodiment of the invention, in which an additional component $C_R$ 402 is coupled between ground and the reference input 304 of amplifier 310. Capacitor $C_R$ 402 reduces the common mode signal to amplifier 310. This additional component further reduces noise gain by reducing the common mode gain of amplifier 310.

Figure 5:
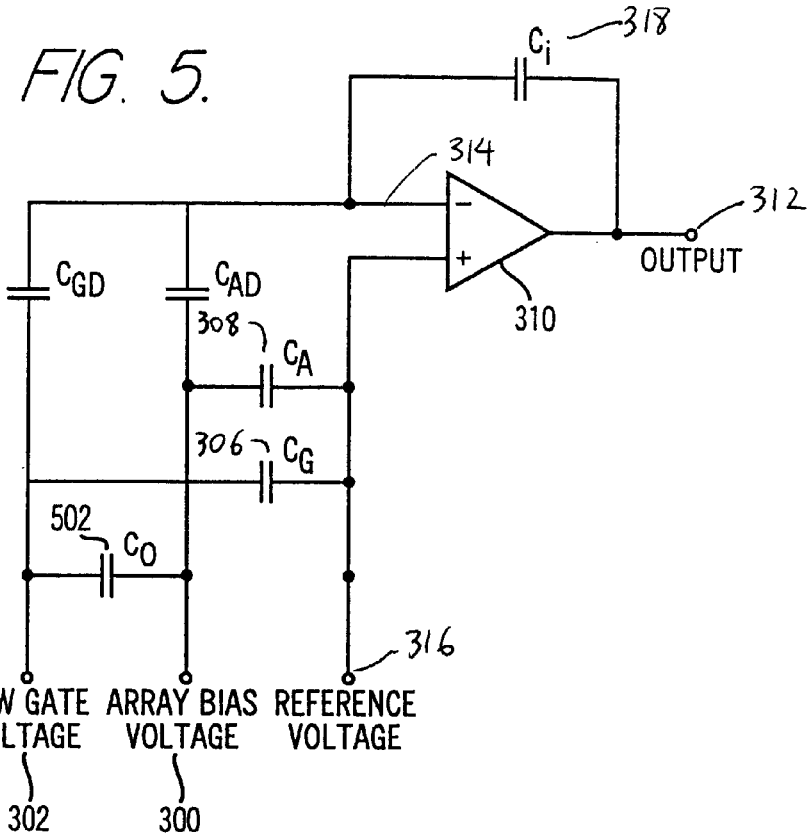
FIG. 5 is a schematic of an embodiment of the invention in which a capacitance component is coupled between the low gate voltage source and the array bias voltage source.

FIG. 5 depicts a schematic of an embodiment of the invention where an additional component $C_o$ 502 is coupled between the array bias voltage 300 and the low gate voltage 302. $C_o$ 502 reduces the differences between the two noise sources 300 and 302, making the noise on both supply lines relatively equivalent to each other.

Figure 6:
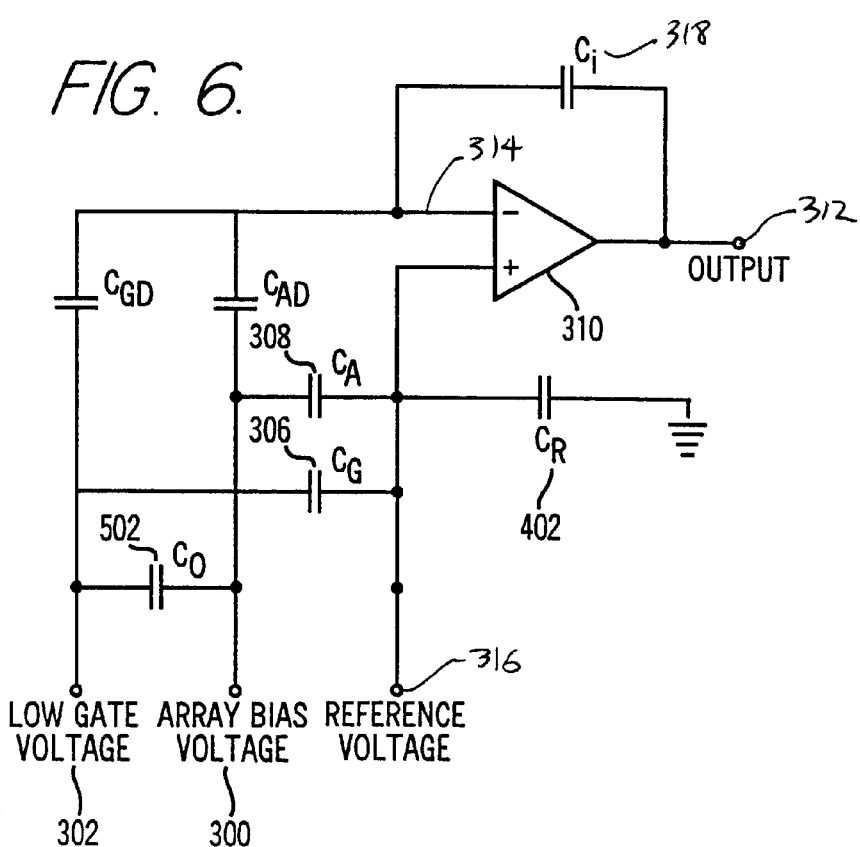
FIG. 6 is a schematic of an embodiment of the invention in which capacitance components are coupled between common noise sources and a reference input of an amplifier, a capacitance component is coupled between the common noise sources, and a capacitance component is coupled between ground and the reference input of the amplifier.

FIG. 6 shows an embodiment of the invention in which capacitors $C_A$ 308, $C_G$ 306, $C_R$ 402, and $C_o$ 502 are all introduced into the circuit to reduce noise from voltage sources 300 and 302.

In a preferred embodiment, the ratio ($C_{GD}/C_i$) is equal to ($C_G/C_R$) and the ratio ($C_{AD}/C_i$) is equal to ($C_A/C_R$). The capacitance of component $C_o$ is preferably chosen to be relatively large compared to the rest of the circuit. The specific frequency range in which the noise reduction is effective depends upon the output impedances of the voltage sources and the value of the added capacitors.

To illustrate the invention, the foregoing explanation was directed to a method and system for reducing line correlated noise that occurs for an entire line (row or column) of image elements for an imager. The invention may also be applied to reduce correlated noise for other groupings or granularities of image elements in addition to lines, depending upon the particular grouping of circuit image elements for which data is sampled in a correlated manner. For example, the invention may be applied to reduce correlated noise for correlated sampling of partial lines of data or for correlated sampling of blocks of image data.

In the foregoing specification, the invention has been described with reference to specific embodiments thereof. It will, however, be evident that various modifications and changes may be made thereto without departing from the broader spirit and scope of the invention. For example, the invention has been described with reference to imager schematics having a common low gate voltage and array bias voltage, in which the reference input of each charge amplifier is connected to these common voltage sources through suitably chosen capacitors. However, the disclosed principles of the invention are equally applicable to address correlated noise in imagers having other common voltage sources. The specification and drawings are, accordingly, to be regarded in an illustrative rather than restrictive sense.

What is claimed is:

1. A circuit for reducing correlated noise in an imager having a plurality of detection elements, the circuit comprising:

a first differential amplifier (110a, 310) comprising a first amplifier output (200a, 312), a first amplifier input line (116a, 314) and a first amplifier reference line (210a, 304), the first amplifier input line (116a, 314) receiving first input signals from a first imager detection element (106a), the first amplifier reference line (210a, 304) receiving a first reference input;

a first switching element (108a) controlling transmission of the first input signals from the first imager detection element (106a) to the first differential amplifier (110a, 310);

a second differential amplifier (110b, 310) comprising a second amplifier output (200b, 312), a second amplifier input line (116b, 314) and a second amplifier reference line (210b, 304), the second amplifier input line (116b, 314) receiving input signals from a second imager detection element (106b), the second amplifier reference line (210b, 304) receiving a second reference input;

a second switching element (108b) controlling transmission of the second input signals from the second imager detection element (106b) to the second differential amplifier (110b, 310);

the circuit configurable to sample the first amplifier output (200a, 312) and the second amplifier output (200b, 312) in a correlated manner;

an array voltage source (122, 300) supplying a first common voltage used at the first and second imager detection elements (106a, 106b);

a switch voltage source (112, 302) supplying a second common voltage used for switching the first and second switching elements (108a, 108b);

a first capacitance component (308) located between the array voltage source (122, 300) and the first and second amplifier reference lines (210, 304); and a second capacitance component (306) located between the switch voltage source (112, 302) and the first and second amplifier reference lines (210, 304).

2. The circuit of claim 1 further comprising:

a third capacitance component (402) located between ground and the first and second amplifier reference lines.

3. The circuit of claim 2 further comprising:

an integrating capacitor (240, 318) coupled between the first amplifier output (200a, 312) and the first amplifier input line (116a, 314), wherein $C_{GD}$ is a first equivalence capacitance on the first amplifier input line from the switch voltage source, $C_{AD}$ is a second equivalence capacitance on the first amplifier input line from the array voltage source (122, 300), $C_i$ is capacitance of the integrating capacitor (240, 318), $C_A$ is capacitance for the first capacitance component (308), $C_G$ is capacitance for the second capacitance component (306), $C_R$ is capacitance for the third capacitance component (402); and the ratio ($C_{GD}/C_i$) is approximately equivalent to ($C_G/C_R$) and the ratio ($C_{AD}/C_i$) is approximately equivalent to ($C_A/C_R$).

4. The circuit of claim 1 further comprising:

a third capacitance component (502) located between the array voltage source and the switch voltage source.

5. The circuit of claim 1 in which the first imager detection element (106a) and the second imager detection element (106b) are located on a same row in the imager.

6. The circuit of claim 1 in which a common reference source (230, 316) is coupled to both the first amplifier reference input (210a, 304) and the second amplifier reference input (210b, 304), wherein the first and second capacitance components are directly connected to the common reference source.

7. The circuit of claim 1 in which the first capacitance component (308) is directly coupled to the array voltage source (122, 300).

8. The circuit of claim 1 in which the second capacitance component (306) is directly coupled to the switch voltage source (112, 302).

9. The circuit of claim 1 in which the first switching element (108a) and the second switching element (108b) are the same component in the circuit.

10. A method for reducing correlated noise in an imager having a plurality of detection elements, the method comprising:

switching a first switching element (108a) to control transmission of a first input signal from a first imager detection element (106a) to a first differential amplifier component (110a, 310), an array voltage source (122, 300) supplying a first common voltage used at the first imager detection element, a switch voltage source (112, 302) supplying a second common voltage for switching;

switching a second switching element (108b) to control transmission of a second input signal from a second imager detection element (106b) to a second differential amplifier component (110b, 310); the array voltage source (122, 300) supplying the first common voltage used at the second imager detection element, the switch voltage source (112, 302) supplying the second common voltage for switching;

receiving a first reference input (210a, 304) at the first differential amplifier component (110a, 310);

receiving a second reference input (210b, 304) at the second differential amplifier component (110b, 310);

generating a first amplifier output from the first differential amplifier component (110a, 310);

generating a second amplifier output from the second differential amplifier component (110b, 310);

sampling the first amplifier output and the second amplifier output in a correlated manner;

coupling the array voltage source (122, 300) to the first and second reference inputs (210a, 210b, 304) using a first capacitance component (308); and coupling the switch voltage source (112, 302) to the first and second reference inputs (210a, 210b, 304) using a second capacitance component (306).

11. The method of claim 10 further comprising:
coupling a third capacitance component (402) between ground and the first and second reference inputs (210a, 210b, 304).

12. The method of claim 11 further comprising:
coupling an integrating capacitor (240, 318) between the first input line (116a, 314) and the first amplifier output (200a, 312), where $C_{GD}$ is a first equivalence capacitance on the first amplifier input line from the switch voltage source (112, 302), $C_{AD}$ is a second equivalence capacitance on the first amplifier input line from the array voltage source (122, 300), $C_i$ is capacitance of the integrating capacitor (240, 318), $C_A$ is capacitance for the first capacitance component (308), $C_G$, is capacitance for the second capacitance component (306), $C_R$ is capacitance for the third capacitance component (402); and the ratio ($C_{GD}/C_i$) is approximately equivalent to ($C_G/C_R$) and the ratio ($C_{AD}/C_i$) is approximately equivalent to ($C_A/C_R$).

13. The method of claim 10 further comprising:
coupling a third capacitance component (402) between the array voltage source (122, 300) and the switch voltage source (112, 302).

14. The method of claim 10 in which the first imager detection element (106a) and the second imager detection element (106b) are located on a same row in the imager.

15. The method of claim 10 in which a common reference source (230, 316) is coupled to both the first amplifier reference input (210a, 304) and the second amplifier reference input (210b, 304), wherein the first and second capacitance components (308, 306) are directly connected to common reference source.

16. The method of claim 10 in which the first capacitance component (308) is directly coupled to the array voltage source (122, 300).

17. The method of claim 10 in which the second capacitance component (306) is directly coupled to the switch voltage source (112, 302).

18. The method of claim 10 in which the first switching element (108a) and the second switching element (108b) are the same component.

19. A circuit for reducing correlated noise in an imager having a plurality of detection elements, the circuit comprising:

a first differential amplifier (110a, 310) comprising a first amplifier output (200a, 312), a first amplifier input line (116a, 314) and a first amplifier reference line (210a, 304), the first amplifier input line (116a, 314) receiving first input signals from a first imager detection element (106a), the first amplifier reference line (210a, 304) receiving a first reference input;

a second differential amplifier (110b, 310) comprising a second amplifier output (200b,312), a second amplifier input line (116b, 314) and a second amplifier reference line (210b, 304), the second amplifier input line (116b, 314) receiving input signals from a second imager detection element (106b), the second amplifier reference line (210b, 304) receiving a second reference input;

the circuit configurable to sample the first amplifier output (200a, 312) and the second amplifier output (200b, 312) together in a correlated manner;

one or more common voltage sources (122, 300, 112, 302) supplying one or more common voltages having a noise component, the one or more common voltages used generate and sample the first and second amplifier outputs; and one or more capacitance components (306, 308), each of the one or more capacitance components located between selected ones of the one or more common voltage sources (122, 300, 112, 302) and the first and second amplifier reference lines (210, 304).

20. The circuit of claim 19 in which the one or more capacitance components (306, 308) comprises a first capacitance component (308) located between an array voltage source (122, 300) and the first and second amplifier reference lines (210a, 210b, 304), the array voltage source supplying a first common voltage used at the first and second imager detection elements (106a, 106b).

21. The circuit of claim 20 in which the first capacitance component (308) is directly coupled to the array voltage source (122, 300).

22. The circuit of claim 19 in which the one or more capacitance components (306, 308) comprises a second capacitance component (306) located between a switch voltage source (112, 302) and the first and second amplifier reference lines (210a, 210b, 304).

23. The circuit of claim 22, wherein the one or more capacitance components (306, 308) further comprises a first capacitance component (308) located between an array voltage source (122, 300) and the first and second amplifier reference lines (210a, 210b, 304), the array voltage source supplying a first common voltage used at the first and second imager detection elements (106a, 106b).

24. The circuit of claim 23 in which a common reference source (230, 316) is coupled to both the first amplifier reference line (210a, 304) and the second amplifier reference line (210b, 304), wherein the first and second capacitance components (308, 306) are directly connected to the common reference source (230, 316).

25. The circuit of claim 22 in which the second capacitance component (306) is directly coupled to the switch voltage source (112, 302).

26. The circuit of claim 19 further comprising:
a third capacitance component (402) located between ground and the first and second amplifier reference lines (210a, 210b, 304).

27. The circuit of claim 19 further comprising:
a fourth capacitance component (502) located between the array voltage source (122, 300) and the switch voltage source (112, 302).

28. The circuit of claim 19 in which the first imager detection element (106a) and the second imager detection element (106b) are located on a same row in the imager.

29. A circuit for reducing correlated noise in an imager having a plurality of detection elements, the circuit comprising:
a differential amplifier (110a, 110b, 310) comprising an amplifier output (200a, 200b, 312), an amplifier input line (116a, 116b, 314) and an amplifier reference line (210a, 210b, 304), the amplifier input line (116a, 116b, 314) receiving input signal from an imager detection element (106a, 106b), the amplifier reference line (210a, 210b, 304) receiving a reference input;

a switching element (108a, 108b) controlling transmission of the first input signals from the imager detection element (106a, 106b) to the differential amplifier (110a, 110b, 310);

an array voltage source (122, 300) supplying a voltage used at the imager detection element (106a, 106b);

a switch voltage source (112, 302) supplying a voltage used for switching the switching element (108a, 108b);

a first capacitance component (308) located between the array voltage source (122, 300) and the amplifier reference line (210, 304); and a second capacitance component (306) located between the switch voltage source (112, 302) and the amplifier reference line (210, 304).

30. The circuit of claim 29, further comprising:
a third capacitance component (402) located between ground and the amplifier reference line (210, 304).

31. The circuit of claim 30, further comprising:
an integrating capacitor (240, 318) coupled between the amplifier output (200, 312) and the amplifier input line (116, 314), wherein $C_{GD}$ is a first equivalence capacitance on the amplifier input line from the switch voltage source (112, 302), $C_{AD}$ is a second equivalence capacitance on the amplifier input line from the array voltage source (122, 300), $C_i$ is capacitance of the integrating capacitor (240, 318), $C_A$ is capacitance for the first capacitance component (308), $C_G$ is capacitance for the second capacitance component (306), $C_R$ is capacitance for the third capacitance component (402); and the ratio $(C_{GD}/C_i)$ is approximately equivalent to $(C_G/C_R)$ and the ratio $(C_{AD}/C_i)$ is approximately equivalent to $(C_A/C_R)$.

32. The circuit of claim 29, further comprising:
a third capacitance component (502) located between the array voltage source (122, 300) and the switch voltage source (112, 302).

33. The circuit of claim 29, wherein the first capacitance component (308) is directly coupled to the array voltage source (122, 300).

34. The circuit of claim 29, wherein the second capacitance component (306) is directly coupled to the switch voltage source (112, 302).

* * * * *